(12) United States Patent
Kim et al.

(10) Patent No.: US 10,502,841 B2
(45) Date of Patent: Dec. 10, 2019

(54) SMART DOSIMETER FOR COUPLING OF LEGAL DOSIMETER

(71) Applicant: LENIVEN CO. LTD, Paldal-gu, Suwon-si, Gyeonggi-do (KR)

(72) Inventors: Hoon-Yu Kim, Hwaseongi-si (KR); Ho-Sun Lim, Seoul (KR)

(73) Assignee: LENIVEN CO. LTD, Gyeonggi-Do (KR)

( * ) Notice: Subject to any disclaimer, the term of this patent is extended or adjusted under 35 U.S.C. 154(b) by 0 days.

(21) Appl. No.: 15/781,858

(22) PCT Filed: Dec. 6, 2016

(86) PCT No.: PCT/KR2016/014227
§ 371 (c)(1),
(2) Date: Jun. 6, 2018

(87) PCT Pub. No.: WO2017/099448
PCT Pub. Date: Jun. 15, 2017

(65) Prior Publication Data
US 2018/0364367 A1    Dec. 20, 2018

(30) Foreign Application Priority Data
Dec. 7, 2015 (KR) .................. 10-2015-0173185

(51) Int. Cl.
*G01T 1/02* (2006.01)
*G01L 19/00* (2006.01)
(Continued)

(52) U.S. Cl.
CPC ............ *G01T 1/02* (2013.01); *G01L 19/00* (2013.01); *G01S 19/13* (2013.01); *G01S 19/14* (2013.01);
(Continued)

(58) Field of Classification Search
CPC ....................................................... G01T 1/02
(Continued)

(56) References Cited

U.S. PATENT DOCUMENTS 4,297,689 A * 10/1981 Shaw ................. G01N 33/0065
204/406
4,301,367 A * 11/1981 Hsu .......................... G01T 1/24
250/370.07

(Continued)

FOREIGN PATENT DOCUMENTS

JP    H07-35864 A    2/1995
JP    H11-23717 A    1/1999
(Continued)

OTHER PUBLICATIONS

Official Action for Korean Appln. No. 10-2015-0173185 dated Mar. 17, 2016.

*Primary Examiner* — Qutbuddin Ghulamali
(74) *Attorney, Agent, or Firm* — Davis & Bujold PLLC; Michael J. Bujold

(57) ABSTRACT

A smart dosimeter coupled to a legal dosimeter and used as if they were incorporated into one structure. A sensor, provided in the smart dosimeter, detects a worker is wearing the legal dosimeter. An instantaneous exposed dose value can be checked, in real time, to assist a worker with performing an operation or task. A motion detection unit detects a motion; a legal dosimeter detection unit checks whether the legal dosimeter is coupled to the smart dosimeter; a wearing check unit checks whether the worker is wearing the legal dosimeter based upon motion information; a G-M detection unit detects a real-time exposed dose of the worker; and a data communication unit transmits the exposed dose, detected by the G-M detection unit, to a (Continued)

management server and receives warning situation information from the management server.

14 Claims, 9 Drawing Sheets

(51) Int. Cl.
| | |
|---|---|
| *G01S 19/14* | (2010.01) |
| *G01V 8/10* | (2006.01) |
| *G01V 9/00* | (2006.01) |
| *G01V 15/00* | (2006.01) |
| *G06K 9/00* | (2006.01) |
| *G01S 19/13* | (2010.01) |
| *G01T 7/12* | (2006.01) |
| *G08B 21/02* | (2006.01) |
| *G01T 7/00* | (2006.01) |

(52) U.S. Cl.
CPC ............... *G01T 7/12* (2013.01); *G01V 8/10* (2013.01); *G01V 9/00* (2013.01); *G01V 15/00* (2013.01); *G06K 9/00* (2013.01); *G06K 9/00087* (2013.01); *G08B 21/02* (2013.01); *G01T 7/00* (2013.01)

(58) Field of Classification Search
USPC .................................................... 340/539.13
See application file for complete search history.

(56) References Cited

U.S. PATENT DOCUMENTS

2005/0285747 A1* 12/2005 Kozlay ................. G08B 21/22
340/573.4
2015/0237419 A1* 8/2015 Lee .......................... H04Q 9/00
340/870.02

FOREIGN PATENT DOCUMENTS

| | | |
|---|---|---|
| JP | 4539314 B2 | 9/2010 |
| KR | 10-0942419 B1 | 2/2010 |
| KR | 10-2010-0083642 | 7/2010 |
| KR | 10-1207898 B1 | 2/2013 |
| KR | 10-1450169 B1 | 10/2014 |
| KR | 20-0175530 | 12/2014 |

\* cited by examiner

SMART DOSIMETER FOR COUPLING OF LEGAL DOSIMETER

TECHNICAL FIELD

The present invention relates to a smart dosimeter capable of coupling a legal dosimeter, and more particularly, to a smart dosimeter for coupling of a legal dosimeter, which is capable of sensing whether a worker wears the legal dosimeter is detected by a sensor provided in the smart dosimeter, distinguishing an actual user with fingerprint recognition, and enabling a worker to check an instantaneous exposed dose value in real time so as to assist the worker to more safely perform an operation.

BACKGROUND ART

Radioactivity, for example nuclear energy, is used as a core energy source today for its very high utility value and a wide variety of applications. However, in the process of using the nuclear energy, a radioactive material is released that can threaten the lives of people and therefore, its use requires thorough management. Accordingly, for the radiation workers who work outside the nuclear power plant as well as inside the nuclear power plant, it is regulated by the Nuclear Safety Act that the dose limit be managed at 50 mSv or less per year cumulative and at 100 mSv or less for 5 years cumulative. Related authorities require that workers be provided with protective equipment to prevent the workers from exposure to radiation, and that facilities such as radiation shielding facilities, ventilation and defense facilities and surveillance facilities be arranged for the safety of radiation workers. In addition, the dose limit of the worker is managed by regularly reading the exposed dose of the radiation worker. The exposed dose readings are intended to be read at least quarterly (in the case of TLDs), but the period may be shortened as necessary.

Accordingly, the radiation worker is obliged to wear a legal dosimeter (a dosimeter that is legally recognized as a tool for measuring radiation dose), which is a means for measuring the radiation dose (exposed dose). The legal dosimeter is a tool used to measure and evaluate the exposed dose of an individual, allowing a radiation worker who is exposed to radiation to check the exposed dose by reading the legal dosimeter. Currently, the most widely used legal dosimeters are thermal luminescence dosimeter (TLD) and optical stimulation luminescence dosimeter (OSL), and all the legal dosimeters including the TLD and OSL are analog-type dosimeters that cannot be immediately numerically checked, but require separate reading tasks.

By reading these legal dosimeters, the annual personal average exposed dose of the radiation worker is continuously maintained so that it does not exceed the dose limit. As described above, thorough management is very important for the safety of the radiation workers who work with and around the radioactive material.

While the legal dosimeter described above has an advantage in that the exposed dose can be checked accurately through readings, it has a disadvantage in that it is impossible to check the numerical value without going through an intermediate process of reading with an analog verification method. In particular, since the act of reading is not carried out every day (it is usual to read quarterly or monthly), instantaneous exposed dose and cumulative exposed dose cannot be checked in real time, which is not enough to prevent exposure to excessive radiation or respond quickly and take action in case of accidents.

For this reason, workers had to wear assistant dosimeters separate from the legal dosimeter, in order to check the instantaneous exposed dose value in real time to ensure safer operation.

However, in spite of the advantage of the assistant dosimeter, it is inconvenient for the worker to wear another dosimeter (i.e., assistant dosimeter) in addition to the legal dosimeter he/she is already wearing, and for this reason, the worker sometimes neglects his/her duty to wear the assistant dosimeter during the operation. This is a very dangerous act because the worker is exposing himself/herself to a risk of radiation accident without having any countermeasures.

In addition, while it is legally required to wear the legal dosimeter as well as assistant dosimeter, with the dosimeter alone, there is no way to know if a worker has actually worn the legal dosimeter. By taking advantage of this, there are cases where: a plurality of workers share one single legal dosimeter; workers do not wear their own legal dosimeters, but wear the legal dosimeter of the others; or workers do not wear the legal dosimeters at all during operation, thus intentionally or unintentionally contribute to the manipulation of the data about the exposed dose values.

Whether it is intended or not, it is true that the workers in many cases do not usually wear the legal dosimeters at work, deteriorating the reliability of the data of the actual exposed dose reading of the workers.

Accordingly, there is a need for a device that can provide worker safety measures, which can prevent workers from being exposed to an accidental exposure at work, and increase the reliability of exposed dose data.

Examples of the prior arts of the present invention can be found in patent documents including KR Patent No. 10-0942419 (Patent Document 1), entitled "The Apparatus of Reforming a Dosimeter", and KR Patent No. 10-1450169 (Patent Document 2), entitled "Automated Dosimetry Record and Transmission System Using the Automated Dosimetry Record and Transmission Method Using the Automated Dosimetry Record".

DISCLOSURE

Technical Problem

An aspect of the present invention provides a smart dosimeter for coupling of a legal dosimeter, in which: the structure of the smart dosimeter is such that a legal dosimeter can be attached and coupled to the smart dosimeter, and the smart dosimeter and the legal dosimeter are used as if they were incorporated into one structure; whether a worker wears the legal dosimeter is detected by a sensor provided in the smart dosimeter; an instantaneous exposed dose value can be checked in real time through the smart dosimeter so as to assist a worker to more safely perform an operation.

Another aspect of the present invention provides a smart dosimeter for coupling of a legal dosimeter, which can supplement the disadvantage of the conventional legal dosimeter with which it is not possible to check whether the legal dosimeter is worn or not, by checking whether the legal dosimeter is worn or not by use of a sensor, and which assists the worker to continue safe operation by providing an alarm sound of a buzzer or the like in accordance with the warning situation information received by the smart dosimeter.

another aspect of the present invention provides a smart dosimeter for coupling of a legal dosimeter, which enables user identification by fingerprint recognition through the smart dosimeter with fingerprint recognition function, thereby making it impossible for a plurality of workers to share the same legal dosimeter, thus resulting in increased reliability of the readout value of the exposed dose of the legal dosimeter.

The aspects that are intended to be addressed by the present invention are not limited to those mentioned above, and other aspects that are not mentioned above can be clearly understood to those skilled in the art based on the description provided below.

Technical Solution

According to an aspect of the present invention, there is provided a smart dosimeter for coupling of a legal dosimeter including: a coupling part for coupling and fixing the legal dosimeter; a legal dosimeter detection unit formed at a position adjacent to the coupling part to check if the legal dosimeter is coupled to the smart dosimeter when the legal dosimeter is positioned and fixed to the coupling part; and a G-M detection unit for measuring an instantaneous exposed dose value in real time, in which the smart dosimeter detects whether a worker wears the legal dosimeter or not through the legal dosimeter detection unit, and checks the instantaneous exposed dose value in real time with the G-M detection unit provided therein.

Preferably, the smart dosimeter further includes: an LCD display unit that displays real-time exposed dose information detected by the G-M detection unit and warning situation information received from a data communication unit; an operation button for setting a function of the smart dosimeter and inputting user information; and a fingerprint recognition unit for recognizing the fingerprint of the worker.

Preferably, the legal dosimeter detection unit includes a sensor including a proximity sensor, an infrared sensor, a pressure sensor, or a detection sensor, or a near filed communication means including an RFID.

Preferably, the coupling part may include an insertion groove configured on one side of the smart dosimeter and the legal dosimeter adapter having a plate shape, which is higher than the legal dosimeter having one side bound by a pincer formed on a surface of a casing of the legal dosimeter, is inserted by a predetermined force into the insertion groove, such that the legal dosimeter is coupled and fixed to the smart dosimeter.

Preferably, the legal dosimeter may include a pincer configured on a surface of a casing of the legal dosimeter and a legal dosimeter adapter having a plate shape higher than the legal dosimeter of which one side is bound by the pincers, and the other side of the legal dosimeter adapter not bound by the pincer may be inserted into the insertion groove configured in the smart dosimeter and fixed therein.

Preferably, when the adapter to which the legal dosimeter is attached is inserted completely into the insertion groove, it is recognized that the legal dosimeter is coupled with the smart dosimeter, through the legal dosimeter detection unit positioned within the insertion groove or outside the periphery of the insertion groove.

Preferably, the coupling part may include a fixing part for supporting and positioning the adapter of the legal dosimeter inserted into the insertion groove, a switch for controlling whether to fix or release the fixing part by a pushing force exerted from outside; and an elastic part for pushing the legal dosimeter, which is inserted in the insertion groove, out of the insertion groove using an elastic force.

Preferably, the coupling part may include a plate-type legal dosimeter adapter fixed on a back side of the smart dosimeter, at a position higher than an upper portion of the smart dosimeter, and one side of the legal dosimeter adapter may be bound by a pincer formed on a surface of the casing of the legal dosimeter such that the legal dosimeter is coupled and fixed to the smart dosimeter.

Preferably, the coupling part may include a legal dosimeter insertion pocket configured on one side of the smart dosimeter, and the legal dosimeter may be inserted into an inner hole of the insertion pocket and then the insertion pocket may be inserted into the smart dosimeter and fixed therein.

Preferably, the coupling part may be configured such that the insertion pocket is inserted into or popped out of the smart dosimeter when the upper portion of the insertion pocket is pressed.

Preferably, the coupling part may further include a driving unit to move and position the insertion pocket inside or outside the smart dosimeter according to a selecting of an external button or a switch.

Preferably, the coupling part may include a fixing part for supporting and fixing the insertion pocket, a switch for controlling whether to fix or release the fixing part by a pushing force exerted from outside, and an elastic part for pushing out the insertion pocket inserted into the inside, out of the smart dosimeter using an elastic force.

Preferably, the smart dosimeter may include a projection part configured in a predetermined area of a front side, allowing to check the legal dosimeter inserted and fixed inside from outside.

Preferably, the coupling part may include a protrusion configured in the insertion groove such that a groove configured in a plate-type connecting part formed integrally with the legal dosimeter inserted in the insertion groove, and the protrusion are engaged with each other to support and fix the legal dosimeter inserted into the insertion groove, and the fixing part is controlled to open or close at one side by a pushing or pulling force exerted from outside.

According to another aspect of the present invention, there is provided a smart dosimeter for coupling of a legal dosimeter including: a motion detection unit for detecting a motion of a smart dosimeter; a legal dosimeter detection unit for checking whether a legal dosimeter is coupled and fixed to a coupling part included in the smart dosimeter; a wearing check unit for checking whether a radiation worker is wearing the legal dosimeter on the basis of motion information detected by the motion detection unit and coupling/fixation information checked by the legal dosimeter detection unit; a G-M detection unit for measuring and detecting the real-time exposed dose of the radiation worker; and a data communication unit for transmitting the exposed dose detected by the G-M detection unit to a management server, and receiving warning situation information from the management server.

Preferably, the smart dosimeter may further include a fingerprint recognition unit for recognizing a fingerprint of a worker, and the data communication unit sends the worker fingerprint information recognized by the fingerprint recognition unit to the management server.

Preferably, the smart dosimeter may further include a GPS module for receiving position information of the worker received from a GPS network over a GPS antenna, and the data communication unit sends the position information received from the GPS module to the management server.

Preferably, the smart dosimeter may further include an LCD display unit for displaying real-time exposed dose information detected by the G-M detection unit and warning situation information received from the data communication unit, or displaying a cumulative exposed dose of the recognized worker upon recognizing the worker through the fingerprint recognition by the fingerprint recognition unit, and displaying warning and usage restrictions for a worker whose cumulative exposed dose is close to or exceeds a limit; and an alarm unit for outputting a sound to the outside to provide an alarm sound to the worker when the real-time exposed dose detected by the G-M detection unit is higher than a preset reference exposed dose, or when the warning situation information or warning and usage restrictions are displayed on the LCD display unit.

Preferably, when displaying the warning situation information, the LCD display unit may either display the background color in red or flash the warning situation information or the background color.

Preferably, the alarm unit may differently output at least one of a size, a type, and a type of a sound to be outputted (a dot sound source, a line sound source, and the like) to differentiate an outputted sound between when the function and setting error of smart dosimeter occurs and when warning situation occurs.

According to another aspect of the present invention, there is provided a smart dosimeter for coupling of a legal dosimeter including: a motion detection unit for detecting a motion of the smart dosimeter; a legal dosimeter detection unit for checking whether a legal dosimeter is coupled and fixed to a coupling part included in the smart dosimeter; a wearing check unit for checking whether a radiation worker is wearing the legal dosimeter on the basis of motion information detected by the motion detection unit and coupling/fixation information checked by the legal dosimeter detection unit; a fingerprint recognition unit for recognizing a fingerprint of the worker; a G-M detection unit for measuring and detecting the real-time exposed dose of the radiation worker; a GPS module for receiving position information of the worker received from a GPS network over a GPS antenna; a data communication unit for sending worker fingerprint information recognized by the fingerprint recognition unit, the exposed dose detected by the G-M detection unit and the position information received from the GPS module to a management server, and receiving warning situation information from the management server; an LCD display unit for displaying real-time exposed dose information detected by the G-M detection unit and warning situation information received from the data communication unit, or displaying a cumulative exposed dose of the recognized worker upon recognizing the worker by the fingerprint recognition by the fingerprint recognition unit, and displaying warning and usage restrictions for a worker whose cumulative exposed dose is close to or exceeds a limit; and an alarm unit for outputting a sound to the outside to provide an alarm sound to the worker when the real-time exposed dose detected by the G-M detection unit is higher than a preset reference exposed dose, or when the warning situation information or warning and usage restrictions are displayed on the LCD display unit.

Advantageous Effects

According to the smart dosimeter for coupling of a legal dosimeter according to the present invention configured as described above, the following effects are provided.

First, it is possible to check whether a legal dosimeter is worn or not simply by wearing the smart dosimeter. Since this makes the radiation worker check whether he/she has worn the legal dosimeter which is obligatory to wear, the smart dosimeter helps the radiation worker to be accustomed to wearing the legal dosimeter.

Second, since the legal dosimeter is combined with the smart dosimeter, it is possible to solve the inconvenience caused by using the two separate dosimeters individually, thereby providing convenience of use.

Third, since the legal dosimeter can be combined with the smart dosimeter and used as an integral type, it is more convenient to use than other assistant dosimeters that have to be used separately, and accordingly, increased frequency of use is expected. In addition, the smart dosimeter enables the worker to work more safely by allowing him/her to check the real-time exposed dose at work.

Fourth, with the user information provided by the finger recognition of the smart dosimeter, accurate information about the actual workers is provided regarding the exposed dose data, which leads to construction of accurate data. Accordingly, the cumulative exposure dose and the real-time exposed dose of each user can be checked more accurately, thus allowing more effective safety management.

Fifth, regarding the safety management at the worksite, by displaying a danger message and generating an alarm sound, there is an effect that a worker can be thoroughly alerted for a possible safety accident that can happen to him/her, since the worker is provided with audiovisual warning.

Sixth, it is possible to check and manage the information such as the position and the exposed dose of the worker sent through the server, such that incase of a radiation accident, data gathered from the worksite can help to grasp the site situation, and the position of the victim can also be identified and can be used as a basis for proper emergency assistance.

DETAILED DESCRIPTION OF THE PREFERRED EMBODIMENT

Figure 1:
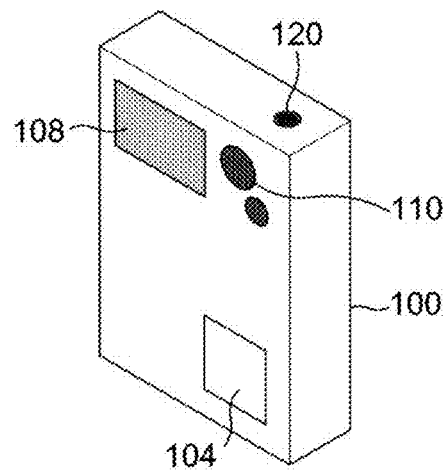
FIG. 1 is a block diagram illustrating an external configuration of a smart dosimeter for coupling of a legal dosimeter according to an embodiment of the present invention.

Other objects, features and advantages of the present invention will become apparent from the detailed description of embodiments with reference to the accompanying drawings.

A preferred embodiment of a smart dosimeter for coupling of a legal dosimeter in accordance with the present invention will now be described below with reference to the accompanying drawings. However, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Accordingly, while the embodiments described herein and the configurations shown in the drawings are the most preferred embodiments of the present invention, these do not represent all of the technical ideas of the present invention, and therefore, it should be understood that various equivalents and modifications are possible.

FIG. 1 is a block diagram illustrating an external configuration of a smart dosimeter for coupling of a legal dosimeter according to an embodiment of the present invention.

First, the external configuration of the smart dosimeter will be described by reference to FIG. 1. A smart dosimeter 100 according to the present invention includes a coupling part (not shown) for coupling and fixing a legal dosimeter 200 to the smart dosimeter 100, a legal dosimeter detection unit 120 formed at a position adjacent to the coupling part to check whether the legal dosimeter 200 is coupled to the smart dosimeter 100 or not, when the legal dosimeter 200 is positioned and fixed to the coupling part, and a G-M detection unit 105 for measuring an instantaneous exposed dose value in real time. In addition, the smart dosimeter 100 according to the present invention further includes an LCD display unit 108 for displaying real-time exposed dose information detected by the G-M detection unit 105 and the warning situation information received from a data communication unit, an operation button 110 for setting a function of the smart dosimeter 100 and inputting information, and a fingerprint recognition unit 104 for recognizing the fingerprint of the worker.

The smart dosimeter 100 detects a whether the legal dosimeter 200 is coupled or not, through the legal dosimeter detection unit 120, and checks the instantaneous exposed dose value in real time through the G-M detection unit 105.

In this example, the legal dosimeter detection unit 120 may be configured to use various types of sensors such as a proximity sensor, an infrared sensor, a pressure sensor, or a detection sensor, or a near-field communication means such as RFID, or the like, to allow the smart dosimeter 100 to recognize the legal dosimeter 200.

Meanwhile, since the form of the coupling part varies according to the manner of coupling with the legal dosimeter 200 in various embodiments, the detailed configuration thereof is not shown in FIG. 1, while it will be described in detail by referring to various embodiments below according to the manners of coupling with the legal dosimeter 200.

First Embodiment

Figure 2:
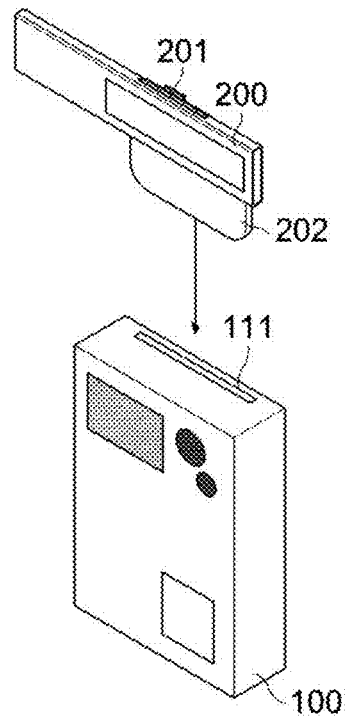
FIGS. 2 to 10 illustrate an embodiment of the configuration of a coupling part of the smart dosimeter of FIG. 1.
Figure 3:
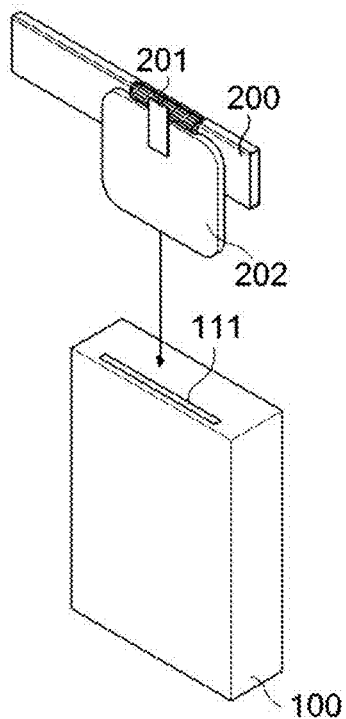
Figure 4:
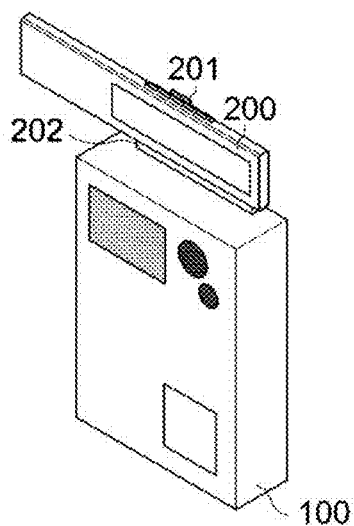
Figure 5:
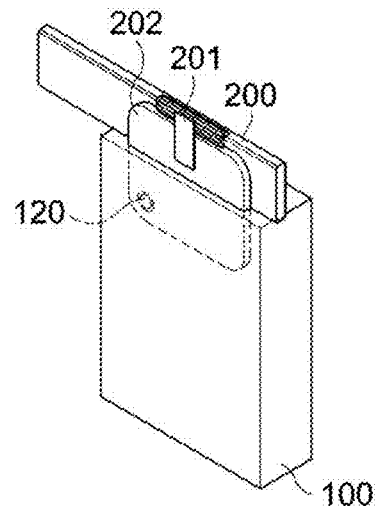

FIG. 2 illustrates the configuration of the coupling part of the smart dosimeter of FIG. 1 according to the first embodiment, and FIGS. 2 and 4 show the front view, and FIGS. 3 and 5 show the rear view.

As shown in the configuration illustrated in FIGS. 2 to 5, a coupling part including an insertion groove 111 is formed on one side of the smart dosimeter 100 such that the legal dosimeter 200 is coupled and fixed with the smart dosimeter 100 by inserting an adapter 202, to which the legal dosimeter 200 is attached, into the insertion groove 111 with a predetermined force.

In this example, the legal dosimeter 200 fixed to the smart dosimeter 100 includes a pincer 201 configured on a surface of a casing of the legal dosimeter 200, and the legal dosimeter adapter 202 having a plate shape higher than the legal dosimeter 200 of which one side is bound by the pincer 201, in which the other side of the legal dosimeter adapter 202 not bound by the pincer 201 is inserted into the insertion groove 111 configured on the smart dosimeter 100 and fixed therein.

When the legal dosimeter adapter 202 is inserted completely into the insertion groove 111, it is recognized through the legal dosimeter detection unit 120 positioned within the insertion groove 111 that the legal dosimeter 200 is coupled to the smart dosimeter 100. The legal dosimeter detection unit 120 may preferably be an infrared sensor, a pressure sensor, or a detection sensor.

Meanwhile, referring to FIGS. 2 to 5, the position of the legal dosimeter detection unit 120 is not limited to within the insertion groove 111, and other examples are possible. For example, as shown in FIG. 6, the position of the legal dosimeter detection unit 120 may be on an outer periphery of the insertion groove 111, in which case it is possible to recognize that the legal dosimeter 200 is attached to the legal dosimeter adapter 202 when the legal dosimeter adapter 202 is inserted into the insertion groove 111 and fixed therein.

Figure 6:
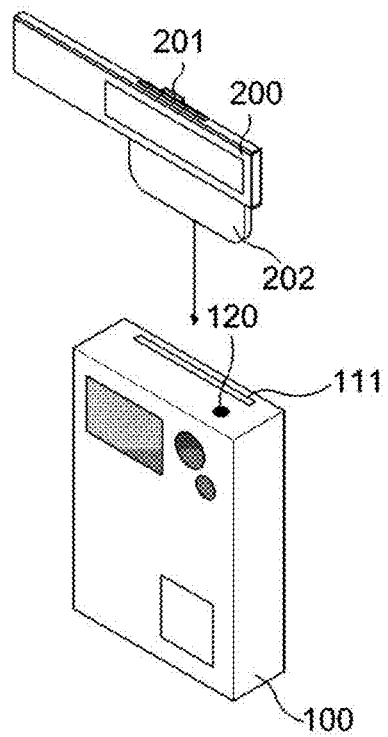

As shown in FIG. 6, the position of the legal dosimeter detection unit 120 may be provided on an outer periphery of the insertion groove 111, because by doing so, it is possible to solve the problem that the attachment of the legal dosimeter 200 to the legal dosimeter adapter 202 is unknown and only the insertion of the legal dosimeter adapter 202 is recognized based on the presence of the legal dosimeter detection unit 120 being positioned within the insertion groove 111. It should be noted, however, that this is merely one of the embodiments provided for illustration of the present invention and not for limitation. Accordingly, the detection unit may be installed at either of the two positions or at any one of the two positions.

Figure 7:
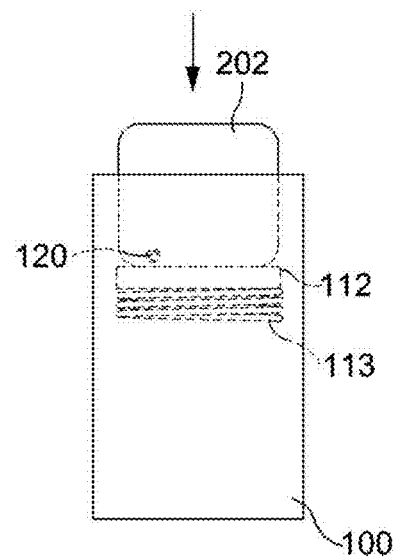
Figure 8:
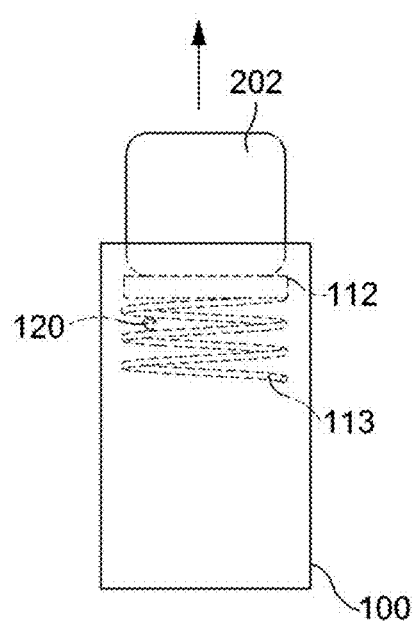
Figure 9:
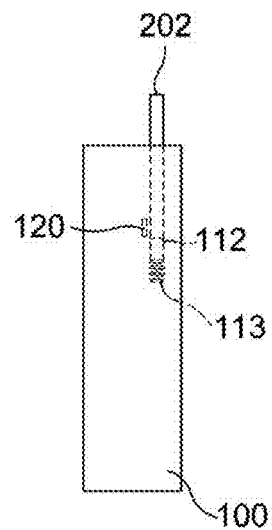

As shown in FIGS. 7 to 9, the insertion groove 111 includes therein a fixing part 112 for supporting and positioning the legal dosimeter adapter 202 to be inserted, a switch (not shown) for controlling whether to fix or release the fixing part 112 with a pushing force exerted from outside, and an elastic part 113 for pushing the legal dosimeter adapter 202 being inserted into the insertion groove 111 out of the insertion groove using an elastic force.

Figure 10:
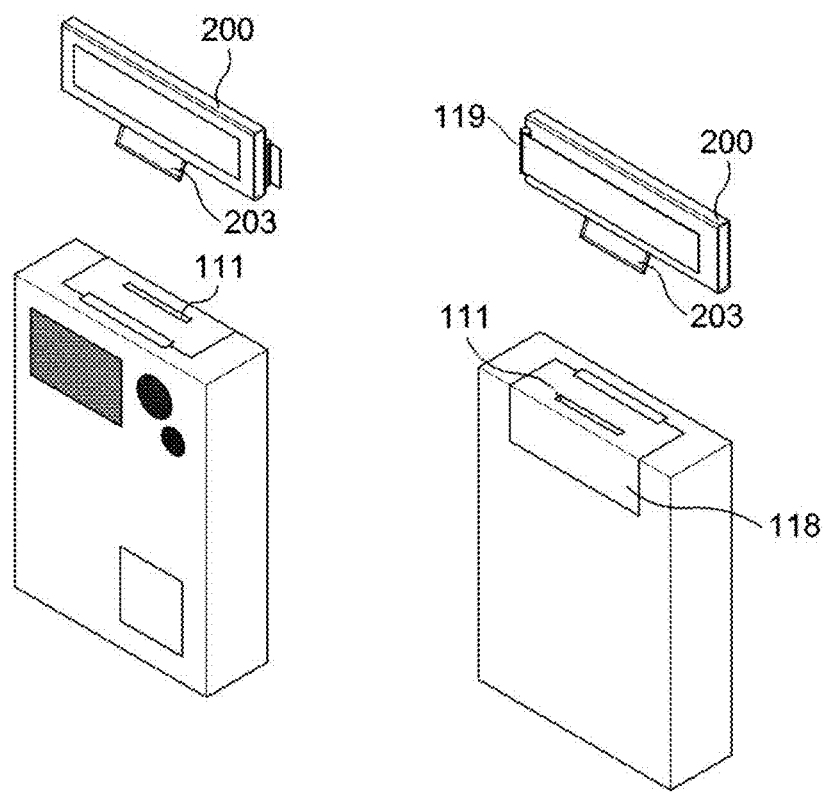

Meanwhile, the legal dosimeter adapter 202 may be configured as a plate-type connecting part 203 integrally formed with the legal dosimeter as shown in FIG. 10. In this example, a protrusion (or groove) is formed in the insertion groove 111 so that the groove (or protrusion) formed in the plate-type connecting part inserted into the insertion groove 111 and the protrusion are engaged with each other and fixed in the insertion groove 111. In addition, a fixing part 118 is provided, having one side opened or locked by an externally-exerted pulling or pushing force such that the groove and protrusion can be engaged with each other and fixed.

The fixing part 118 may be configured to provide convenience such that the fixing part 118 is opened forward when an upper portion of the insertion groove 111 or the fixing part 118 is pulled with a hand (nail) or the like, and returned to the original state (i.e., closed state) when the application of the pulling force is ceased. That is, the similar principle can be found in the configuration of the pincers.

Second Embodiment

Figure 11:
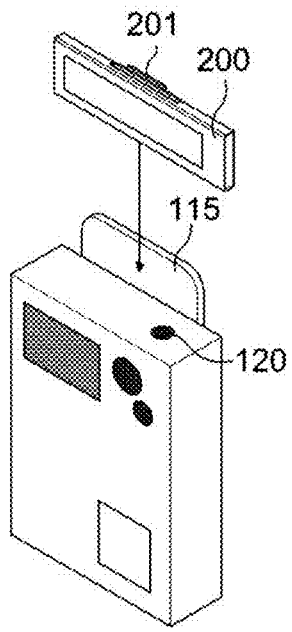
FIGS. 11 and 13 illustrate another embodiment of the configuration of the coupling part of the smart dosimeter of FIG. 1.
Figure 12:
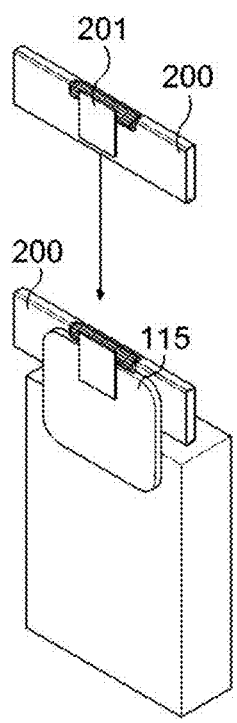

FIGS. 11 and 12 illustrate the configuration of the coupling part of the smart dosimeter of FIG. 1 according to the second embodiment, in which FIG. 11 shows a front view and FIG. 12 shows a rear view.

As shown in FIGS. 11 and 12, the coupling part having a plate-type legal dosimeter adapter 115 is formed on a back side of the smart dosimeter 100, in which the plate-type legal dosimeter adapter 115 is fixed at a position higher than the upper portion of the smart dosimeter 100.

Then, one side of the coupling part, i.e., one side of the legal dosimeter adapter 115 is grabbed with the pincer 201 formed on the surface of the casing of the legal dosimeter 200 and the legal dosimeter 200 is fixed to the smart dosimeter 100.

As shown in FIGS. 11 and 12, when the legal dosimeter 200 is fixed to the smart dosimeter 100, through a legal dosimeter detection unit 120 formed at a position where the legal dosimeter 200 is fixed, it is recognized that the legal dosimeter 200 has been coupled to the smart dosimeter 100. In this example, a proximity sensor is preferably used as the legal dosimeter detection unit 120.

Figure 13:
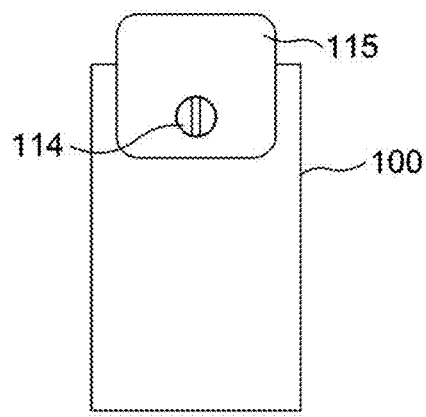

Meanwhile, the legal dosimeter adapter 115 fixed to the smart dosimeter 100 is fastened to the back side of the smart dosimeter 100 by a fastening bolt 114, as shown in FIG. 13. In this example, it should be noted that the configuration in which the legal dosimeter adapter 115 is fixed to the back side of the smart dosimeter 100 using the fastening bolt 114 has been specifically described above according to one preferred embodiment without limitation. Accordingly, those skilled in the art will appreciate that various modifications, additions and substitutions are possible, without departing from the scope and spirit of the disclosure.

The legal dosimeter 200 may be configured to be fixed in the state of being exposed to the outside of the smart dosimeter 100, as described in the first and second embodiments.

That is, the legal dosimeter 200 is coupled to the legal dosimeter adapter 202 or 115 formed on an outer surface of the smart dosimeter 100, using the pincer 201 formed on the casing of the existing legal dosimeter 200 such that the legal dosimeter 200 is fixed in the state of being exposed to the outside of the smart dosimeter 100.

Meanwhile, in the configuration of the casing of the legal dosimeter 200 shown in FIG. 10, the legal dosimeter 200 is coupled to a plate-type connecting part 203 formed on the outer surface of the casing of the legal dosimeter 200 by using the fixing part 118 of the smart dosimeter 100, such that the legal dosimeter 200 is fixed in the state of being exposed to the outside of the smart dosimeter 100. For reference, for certain legal dosimeters such as the TLD that have the similar shape to the plate-type connecting part 203 of the casing of the legal dosimeter 200 shown in FIG. 10, those legal dosimeters can be coupled with the smart dosimeter 100 without requiring the casing of the legal dosimeter 200 having a separate plate-type connecting part 203.

Third Embodiment

However, in the first and second embodiments, the legal dosimeter 200 coupled to the smart dosimeter 100 is fixed in the state of being exposed to the outside, there may be a problem in which the legal dosimeter 200 may be detached from the smart dosimeter 100 or damaged due to an external impact. The third embodiment is characterized by a configuration in which a legal dosimeter 200 is inserted into the smart dosimeter 100 to prevent the problem described above.

Figure 14:
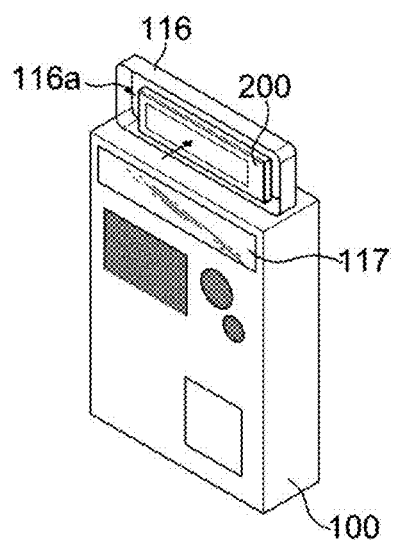
FIGS. 14 to 16 illustrate yet another embodiment of the configuration of the coupling part of the smart dosimeter of FIG. 1.
Figure 15:
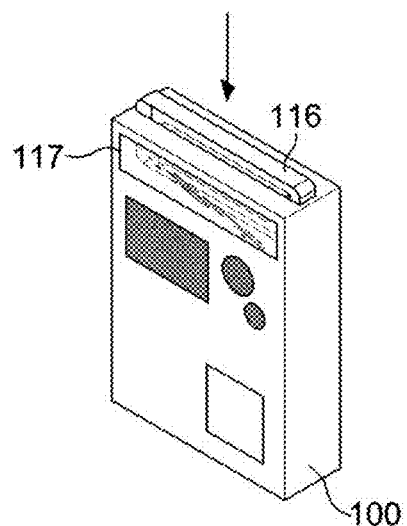
Figure 16:
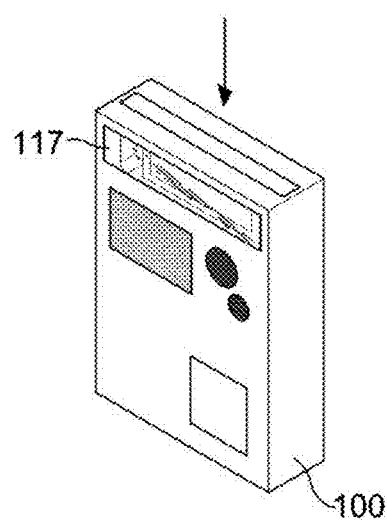

FIGS. 14 to 16 illustrate a third embodiment of the configuration of the coupling part of the smart dosimeter of FIG. 1.

That is, FIGS. 14 to 16 are diagrams provided to illustrate a process of inserting the legal dosimeter 200.

As shown in FIGS. 14 to 16, a coupling part having an insertion pocket 116 for receiving a legal dosimeter 200 is formed on one side (upper surface in the drawings) of the smart dosimeter 100. The legal dosimeter 200 is inserted into an inner hole 116a of the insertion pocket 116, and then the insertion pocket 116 is pushed to an inner direction of the smart dosimeter 100 with a predetermined force so that the legal dosimeter 200 is inserted into the smart dosimeter 100 and fixed. When it is necessary to withdraw the legal dosimeter 200, an upper end of the insertion pocket 116 is pressed and the insertion pocket 116 pops out of the smart dosimeter 100.

In addition, the smart dosimeter 100 additionally includes, in an inner space where the insertion pocket 116 is inserted: a fixing part for supporting and fixing the insertion pocket 116; a switch for controlling whether to fix or release the fixing part by a pushing force exerted from outside; and an elastic part for causing the insertion pocket 116 to be pushed out of the smart dosimeter 100 from the inserted state using an elastic force. This is similar to the configuration shown in FIG. 3 and no further diagrams of such configuration are provided.

In this example, as shown in the drawings, the insertion pocket 116 may be configured such that the upper surface of the insertion pocket 116 is pressed with a predetermined force to be moved and positioned inside and outside the smart dosimeter 100, or alternatively, a separate driving unit may be provided to move and position the insertion pocket 116 inside or outside the smart dosimeter 100 according to an act of pressing an external button or switch. For reference, the configuration described above in which the insertion pocket 116 is moved by the driving unit is already known and can be found in the example of a CD player of a computer, or the like, and a detailed description thereof will be omitted.

Meanwhile, a projection part 117 is formed in a predetermined area of the front surface of the smart dosimeter 100 to allow checking of the legal dosimeter 200 inserted and fixed in the smart dosimeter 100 from outside. The projection part 117 is configured to expose a measurement film for measuring the radiation exposed dose formed on the surface of the legal dosimeter 200 to the outside to facilitate the measurement of the radiation exposed dose through the legal dosimeter 200.

Therefore, it is preferable that the projection part 117 has an open structure that is free of blocking between inside and outside. However, it should be noted that this is merely one example according to the type of the legal dosimeter 200. Accordingly, if the radiation exposed dose can be measured even when the legal dosimeter 200 is not exposed to the outside, the projection part 117 may be blocked by a projection window through which the inside and the outside are projected.

In addition, as described in the third embodiment, with the legal dosimeter 200 being inserted in the inner hole 116a of the insertion pocket 116 formed in the smart dosimeter 100, it is recognized that the legal dosimeter 200 is inserted in the smart dosimeter 100, through the legal dosimeter detection unit 120 positioned within the inner space where insertion pocket 116 is inserted. The legal dosimeter detection unit 120 may preferably be an infrared sensor, a pressure sensor, or a detection sensor.

Meanwhile, in the configuration in which the legal dosimeter is inserted into the insertion pocket 116 of the third embodiment, as shown in FIGS. 14 to 16, the existing legal dosimeter (including the existing casing) may be inserted as it is, but in that case, only the internal measurement film (the internal accessory required for measurement) except for the legal dosimeter casing can be inserted and used.

As in the first to third embodiments described above, the smart dosimeter 100 and the legal dosimeter 200 can be coupled without changing the appearance of the existing legal dosimeter, and accordingly, there is an advantage that the currently used legal dosimeter can be used as it is.

Figure 17:
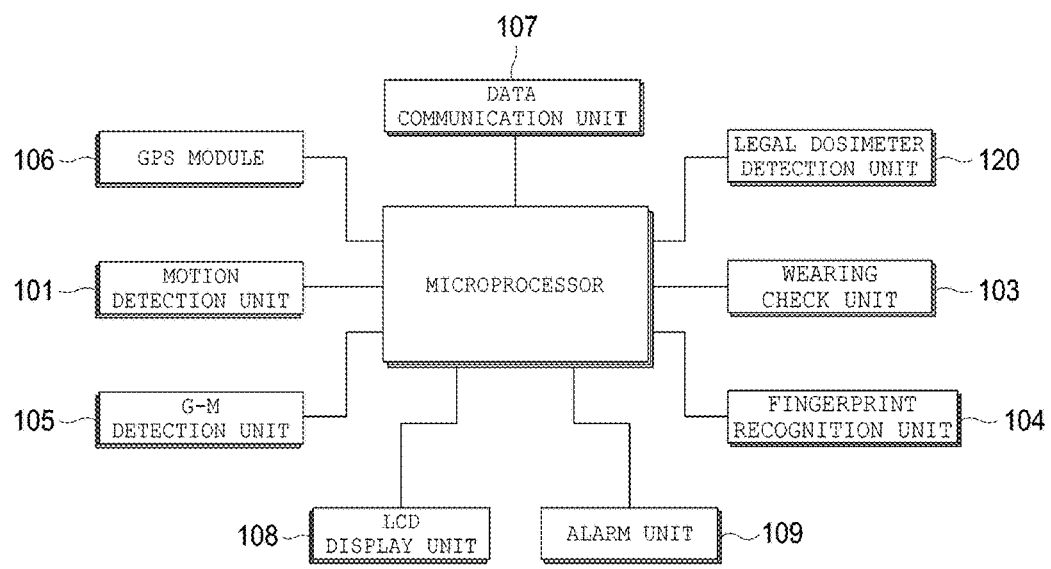
FIG. 17 is a block diagram illustrating an internal configuration of a smart dosimeter for coupling of a legal dosimeter according to an embodiment of the present invention.

FIG. 17 is a block diagram illustrating an internal configuration of a smart dosimeter for coupling of a legal dosimeter according to an embodiment of the present invention.

The inner configuration of the smart dosimeter 100 will be described by referring to FIG. 17, in which the smart dosimeter 100 according to the present invention includes a motion detection unit 101, a legal dosimeter detection unit 120, a wearing check unit 103, a fingerprint recognition unit 104, a G-M detection unit 105, a GPS module 106, a data communication unit 107, an LCD display unit 108, and an alarm unit 109. A microprocessor for controlling the respective components is also provided.

In this example, the motion detection unit 101 is configured to detect a motion of the smart dosimeter 100, and includes a gyro sensor and an acceleration sensor. When the worker wears the smart dosimeter 100, the motion detection unit 101 will detect the motion of the worker as he/she moves. Accordingly, when detecting a motion by the motion detection unit 101, it is determined that the worker has worn the smart dosimeter 100, and when not detecting a motion by the motion detection unit 101, it is determined that the worker has not worn the smart dosimeter 100.

The legal dosimeter detection unit 120 checks whether the legal dosimeter 200 is coupled to the coupling part of the smart dosimeter 100 and fixed in position. The legal dosimeter detection unit 120A may be configured with a sensor such as a proximity sensor, an infrared sensor, a pressure sensor, a detection sensor, and so on, or a near-field communication means such as RFID, and so on and when detecting the legal dosimeter 200 being positioned and fixed in the coupling part of the smart dosimeter 100, the legal dosimeter detection unit 120A determines that the legal dosimeter 200 is coupled to the smart dosimeter 100. Further, the configuration of the coupling part and the detailed configuration in which the legal dosimeter 200 is coupled and fixed thereto are described above with reference to FIGS. 2 to 10, and will not be redundantly described below.

The wearing check unit 103 determines whether the radiation worker is wearing the legal dosimeter 200 or not, based on the motion information detected by the motion detection unit 101 and the coupling/fixation information checked by the legal dosimeter detection unit 120. That is, after checking whether the legal dosimeter 200 is coupled and fixed to the smart dosimeter 100 or not through a detection of the legal dosimeter, and also checking whether the smart dosimeter 100 is worn or not through a detection of the motion of the worker, when both conditions mentioned above are satisfied, the wearing check unit 103 determines that the worker has worn the legal dosimeter 200 properly. If any one of the two conditions is not satisfied, it is determined that the worker has not worn the legal dosimeter 200 and the smart dosimeter 100 properly. For reference, if it is determined that the worker has not worn the legal dosimeter 200 properly, the alarm unit 109 may output an alarm sound to the worker.

In addition, the fingerprint recognition unit 104 recognizes the fingerprint of the worker, sends the recognized worker information to the management server, and sends the worker's wearing condition of the legal dosimeter together, so that the management server can check whether the worker is wearing the legal dosimeter 200. As described above, the fingerprint recognition function embedded in the smart dosimeter makes it possible to distinguish the users of the legal dosimeter, and a cumulative exposed dose data according to the user is stored and sent such that, if the cumulative exposed dose in the smart dosimeter is not the same as the cumulative exposed dose in the legal dosimeter 200, it may indicate a possibility that the worker has used another person's legal dosimeter.

In this example, it is preferable that the recognition of the fingerprint of the worker by the fingerprint recognition unit 104 is performed before checking the wearing of the legal dosimeter by the wearing check unit 103. That is, information of whether the worker identified by the fingerprint recognition has worn the legal dosimeter or not is sent to the management server. Of course, the legal dosimeter may be worn first, but in such a case, the system will continuously generate a beep sound urging the user to check. Upon turn on, the smart dosimeter requires the fingerprint recognition for identifying the user, and the normal operation of the device is available only after the user identification is processed by the fingerprint recognition. Otherwise, there may be an undesirable situation where one worker wears a smart dosimeter and performs work and then has another worker go through the fingerprint recognition instead of himself/herself.

In addition, the G-M detection unit 105 measures and detects the exposed dose of the worker in real time. In this example, the detected exposed dose is sent to the management server in real time.

In addition, the GPS module 106 receives position information of the worker received from the GPS network over the GPS antenna, and the received position information is sent to the management server in real time. By doing this, the position information of the worker can be checked in real time at the management server, which may determine that the worker is approaching closer to a predetermined radiation hazard area, or locate and manage the location of the worker, and by means of such management, it is possible to prevent the occurrence of an exposure to excessive radiation by taking appropriate actions in case of an accident or an emergency.

The data communication unit 107 sends the worker fingerprint information recognized by the fingerprint recognition unit 104, the exposed dose detected by the G-M detection unit 105, and the position information transferred from the GPS module 106 to the management server (not shown) through a wired/wireless communication network. In addition, the data communication unit 107 receives from the management server warning situation information including: authentication failure information of the worker; warning information that the real-time exposed dose or cumulative exposed dose of the worker detected in real time exceeds the legal exposed dose limit; and warning information that the worker approaches closer to the radiation hazard area, and the like.

In this example, the wired/wireless communication network includes the Internet, mobile communication, satellite network, and so on. Meanwhile, the management server refers to a place for monitoring a workplace and a worker from a remote position based on information received from a smart dosimeter, and while the present invention includes a configuration for performing data transmission/reception with a management server, it is to be noted that the key concept of present invention is not the configuration of the data transmission/reception and management server, but based on the configurations and functions of the smart dosimeter. Accordingly, a detailed description with respect to the management server will be omitted.

In addition, the LCD display unit 108 may display the real-time the exposed dose information detected by the G-M detection unit 105 and warning situation information received from the management server in the data communication unit 107, or may display the cumulative exposed dose of the recognized worker upon recognizing the worker through the fingerprint recognition by the fingerprint recognition unit 104, and displays warning and usage restrictions (depending on the setting) for workers whose cumulative exposed dose is close to or exceeds the limit. In this example, the cumulative exposed dose of the worker may be received in a communication with the management server or may be checked through a memory stored in the smart dosimeter. In addition, unlike the example of displaying the real-time exposed dose information, when displaying the warning situation information, the background color may be displayed in red, and additionally, the background color may be flashing according to the displayed warning situation information, thereby allowing the worker to quickly recognize a dangerous situation in the event of warning situation. In addition, the warning and display according to the cumulative exposed dose are preferably displayed first when the fingerprint is recognized (with power ON and immediately after the user identification).

In addition, the alarm unit 109 outputs a sound to the outside to provide an alarm sound to the worker if the real-time exposed dose detected by the G-M detection unit 105 is higher than a preset reference exposed dose, or if the warning situation information is received from the data communication unit 107, or if the function and setting error of smart dosimeter 100 occurs. In this example, the alarm unit 109 differently outputs at least one of a size, a type, and a type of a sound to be outputted (a dot sound source, a line sound source, and the like) to differentiate from the sound outputted when the function and setting error of the smart dosimeter occurs, thereby allowing the worker to immediately recognize a dangerous situation in the event of a warning situation.

With the configuration described above, the present invention allows automatic registration of the status of the workers put into the work field sent from the smart dosimeter 100 into the management server. That is, immediately upon using the smart dosimeter, the user information and position information are sent by the communication function with the management server, and it is thus possible to grasp the situation as to which worker is involved in the work and when.

In addition, the increased worker safety management is provided, since the worker is enabled to visually check the cumulative exposed dose to date and the instantaneous exposed dose at the time of work in real time, and is provided with an alarm sound in case of overexposure. In addition, the location tracking function attached to the smart dosimeter and the communication function with the management server can inform potential danger with an alarm sound when the worker approaches closer to the area with radiation value exceeding a set limit, thereby preventing a safety accident.

Accordingly, as the existing radiation source tracking system enables to identify the position and state of the radiation source by using the radiation source tracking device, the smart dosimeter 100 according to the present invention can transmit the position of the worker and the working environment of the worker, and the like with the function of communicating with the management server, thereby allowing managing personnel to efficiently carry out worker safety management supervision.

In addition, the smart dosimeter 100 according to the present invention clearly identifies the user's information through the fingerprint recognition and transmits the status information such as legal dosimeter detection and motion detection of the worker, thus enabling to determine whether a worker has worn the legal dosimeter 200 or not, and compensating the loopholes in the safety management, which was difficult to verify in real terms, such as in the case where the worker has not worn the legal dosimeter 200 or information of the wearer of the legal dosimeter 200 is unclear, and the like. As a result, it is possible to prevent the workers from damages from exposure to excessive radiation.

It is noted that the technical idea of the present invention described above has been specifically described in the preferred embodiment, while it should be noted that the embodiments described above are intended to be illustrative and not restrictive. That is, although the present invention is described with reference to the configuration in which the existing legal dosimeter system is used as it is, in another example, instead of using the legal dosimeter as it is, only the measurement film 119 inside the casing may be taken out separately and inserted or attached to an assistant dosimeter (smart dosimeter) and used.

In addition, those skilled in the art will appreciate that various modifications, additions and substitutions are possible, without departing from the scope and spirit of the disclosure as disclosed in the accompanying claims. Accordingly, the true scope of the present invention should be determined by the technical idea of the appended claims.

The invention claimed is:

1. A smart dosimeter for coupling of a legal dosimeter, the smart dosimeter comprising:
   a G-M detection unit for measuring an instantaneous exposed dose value in real time,
   a fingerprint recognition unit for recognizing a fingerprint of a worker,
   wherein a data communication unit sends worker information recognized through the fingerprint recognition by the fingerprint recognition unit to the management server; and
   an LCD display unit for displaying real-time exposed dose information detected by the G-M detection unit and warning situation information received from the data communication unit, or displaying a cumulative exposed dose of the recognized worker upon recognizing the worker through the fingerprint recognition by the fingerprint recognition unit, and displaying warning and usage restrictions for a worker whose cumulative exposed dose is close to or exceeds an acceptable limit.

2. The smart dosimeter according to claim 1, further comprising:
   an alarm unit for outputting a sound to the outside to provide an alarm sound to the worker when the real-time exposed dose detected by the G-M detection unit is higher than a preset reference exposed dose, or when the warning situation information or warning and usage restrictions are displayed on the LCD display unit.

3. The smart dosimeter according to claim 1, wherein a legal dosimeter detection unit comprises a sensor which comprises a proximity sensor, an infrared sensor, a pressure sensor, a detection sensor, or a near filed communication means, including an RFID.

4. The smart dosimeter according to claim 1, wherein a coupling part comprises an insertion groove formed on one side of the smart dosimeter, and an adapter of the legal dosimeter is inserted into the insertion groove such that the legal dosimeter is coupled and fixed to the smart dosimeter.

5. The smart dosimeter according to claim 1, wherein, when the legal dosimeter is fixed, the smart dosimeter recognizes, through a legal dosimeter detection unit formed in the fixed position of the legal dosimeter, that the legal dosimeter is coupled to the smart dosimeter.

6. The smart dosimeter according to claim 1, wherein a coupling part comprises a legal dosimeter insertion pocket configured, on one side of the smart dosimeter, and the legal dosimeter is inserted into an inner hole of the insertion pocket and then the insertion pocket is inserted into the smart dosimeter and fixed therein, and
the coupling part is configured such that the insertion pocket is inserted into or popped out of the smart dosimeter when an upper portion of the insertion pocket is pressed.

7. The smart dosimeter according to claim 6, wherein the coupling part further comprises a driving unit to move and position the insertion pocket inside or outside the smart dosimeter according to a selection of an external button or a switch.

8. The smart dosimeter according to claim 6, wherein the coupling part comprises:
a fixing part for supporting and fixing the insertion pocket;
a switch for controlling whether to fix or release the fixing part by a pushing force exerted from outside; and
an elastic part for pushing the insertion pocket out of the smart dosimeter from an inserted state using an elastic force.

9. A smart dosimeter for coupling of a legal dosimeter, the smart dosimeter comprising:
a motion detection unit for detecting a motion of the smart dosimeter;
a legal dosimeter detection unit for checking whether the legal dosimeter is coupled and fixed to a coupling part included in the smart dosimeter;
a wearing check unit for checking whether a radiation worker is wearing the legal dosimeter on a basis of motion information detected by the motion detection unit and coupling/fixation information checked by the legal dosimeter detection unit;
a G-M detection unit for measuring and detecting the real-time exposed dose of the radiation worker; and
a data communication unit for transmitting the exposed dose detected by the G-M detection unit to a management server, and receiving warning situation information from the management server;
a fingerprint recognition unit for recognizing a fingerprint of a worker;
wherein the data communication unit sends worker information recognized through the fingerprint recognition by the fingerprint recognition unit to the management server;
an LCD display unit for displaying real-time exposed dose information detected by the G-M detection unit and warning situation information received from the data communication unit, or displaying a cumulative exposed dose of the recognized worker upon recognizing the worker through the fingerprint recognition by the fingerprint recognition unit, and displaying warning and usage restrictions for a worker whose cumulative exposed dose is close to or exceeds an acceptable limit.

10. The smart dosimeter according to claim 9, further comprising a GPS module for receiving position information of the worker from a GPS network over a GPS antenna,
wherein the data communication unit sends the position information received from the GPS module to the management server.

11. The smart dosimeter according to claim 9, further comprising:
an alarm unit for outputting a sound to the outside to provide an alarm sound to the worker when the real-time exposed dose detected by the G-M detection unit is higher than a preset reference exposed dose, or when the warning situation information or warning and usage restrictions are displayed on the LCD display unit.

12. The smart dosimeter according to claim 11, wherein, when displaying the warning situation information, the LCD display unit either displays the background color in red, or, according to the displayed warning situation information, flashes the background color.

13. The smart dosimeter according to claim 11,
wherein the alarm unit outputs differently at least one of a size, a type, and a type of a sound to be outputted (a dot sound source, a line sound source, and the like) to differentiate an outputted sound between when a function and setting error of the smart dosimeter occurs and when warning situation occurs.

14. A smart dosimeter for coupling of a legal dosimeter, the smart dosimeter comprising:
a motion detection unit for detecting motion of a smart dosimeter;
a legal dosimeter detection unit for checking whether a legal dosimeter is coupled and fixed to a coupling part included in the smart dosimeter;
a wearing check unit for checking whether a radiation worker is wearing the legal dosimeter on the basis of motion information detected by the motion detection unit and coupling/fixation information checked by the legal dosimeter detection unit;
a fingerprint recognition unit for recognizing a fingerprint of the worker;
a G-M detection unit for measuring and detecting the real-time exposed dose of the radiation worker;
a GPS module for receiving position information of the worker received from a GPS network over a GPS antenna;
a data communication unit for sending worker fingerprint information recognized by the fingerprint recognition unit, the exposed dose detected by the G-M detection unit and the position information received from the GPS module to a management server, and receiving warning situation information from the management server;
an LCD display unit for displaying real-time exposed dose information detected by the G-M detection unit and warning situation information received from the data communication unit, or displaying a cumulative exposed dose of the recognized worker upon recognizing the worker through the fingerprint recognition by the fingerprint recognition unit, and displaying warning and usage restrictions for a worker whose cumulative exposed dose is close to or exceeds an acceptable limit; and
an alarm unit for outputting a sound to the outside to provide an alarm sound to the worker when the real-time exposed dose, detected by the G-M detection unit, is higher than a preset reference exposed dose, or when the warning situation information or warning and usage restrictions are displayed on the LCD display unit.

* * * * *